(12) United States Patent
Lutas et al.

(10) Patent No.: US 9,305,167 B2
(45) Date of Patent: Apr. 5, 2016

(54) HARDWARE-ENABLED PREVENTION OF CODE REUSE ATTACKS

(71) Applicant: Bitdefender IPR Management Ltd., Nicosia (CY)

(72) Inventors: Andrei V. Lutas, Satu Mare (RO); Sandor Lukacs, Floresti (RO)

(73) Assignee: Bitdefender IPR Management Ltd., Nicosia (CY)

( * ) Notice: Subject to any disclaimer, the term of this patent is extended or adjusted under 35 U.S.C. 154(b) by 0 days.

(21) Appl. No.: 14/283,351

(22) Filed: May 21, 2014

(65) Prior Publication Data
US 2015/0339480 A1   Nov. 26, 2015

(51) Int. Cl.
G06F 21/00 (2013.01)
G06F 21/56 (2013.01)
G06F 9/30 (2006.01)
G06F 9/54 (2006.01)

(52) U.S. Cl.
CPC ............ *G06F 21/56* (2013.01); *G06F 9/30058* (2013.01); *G06F 9/542* (2013.01); *G06F 2221/033* (2013.01)

(58) Field of Classification Search
USPC .................................. 726/22; 712/234, 245
See application file for complete search history.

(56) References Cited

U.S. PATENT DOCUMENTS

| | | | |
|---|---|---|---|
| 4,334,268 A * | 6/1982 | Boney et al. | 712/234 |
| 6,304,959 B1 | 10/2001 | Konigsburg et al. | |
| 7,178,132 B2 | 2/2007 | Pierce | |
| 7,287,283 B1 | 10/2007 | Szor | |
| 7,552,477 B1 | 6/2009 | Satish et al. | |
| 7,765,579 B2 * | 7/2010 | Wallace | G06F 21/54 |
| | | | 713/194 |
| 7,975,132 B2 | 7/2011 | Bean et al. | |
| 8,141,163 B2 | 3/2012 | Pike | |
| 8,200,987 B2 * | 6/2012 | Campbell | G06F 9/30174 |
| | | | 712/208 |
| 8,402,541 B2 | 3/2013 | Craioveanu et al. | |
| 8,479,053 B2 | 7/2013 | Rajwar et al. | |
| 2005/0071605 A1 | 3/2005 | Hsieh | |
| 2005/0289331 A1 * | 12/2005 | Watt | 712/245 |
| 2008/0114975 A1 | 5/2008 | Yen | |
| 2008/0184016 A1 | 7/2008 | Erlingsson et al. | |

(Continued)

OTHER PUBLICATIONS

Bletsch et al; "Jump oriented programming: a new class of code-reuse attack"; ASIACCS, 2011; 11 pages.*
Salamat et al; "Runtime Defense against Code Injection Attacks Using Replicated Execution", IEEE on Dependable and Secure Computing, vol. 8 No. 4, 2011; pp: 588-601.*
Bania, "Security Mitigations for Return-Oriented Programming Attacks," Kryptos Logic Research Whitepaper, 2010; the year of publication is sufficiently earlier than the effective U.S. filed and any foreign priority date so that the particular month of publication is not in issue.

(Continued)

*Primary Examiner* — Jason Lee
(74) *Attorney, Agent, or Firm* — Law Office of Andrei D Popovici, PC (57) ABSTRACT

Described systems and methods allow protecting a host computer system from malware, such as return-oriented programming (ROP) and jump-oriented programming (JOP) exploits. In some embodiments, a processor of the host system is endowed with two counters configured to store a count of branch instructions and a count of inter-branch instructions, respectively, occurring within a stream of instructions fetched by the processor for execution. Exemplary counted branch instructions include indirect JMP, indirect CALL, and RET on x86 platforms, while inter-branch instructions consist of instructions executed between two consecutive counted branch instructions. The processor may be further configured to generate a processor event, such as an exception, when a value stored in a counter exceeds a predetermined threshold. Such events may be used as triggers for launching a malware analysis to determine whether the host system is subject to a code reuse attack.

23 Claims, 8 Drawing Sheets

(56) References Cited

U.S. PATENT DOCUMENTS

| | | | |
|---|---|---|---|
| 2009/0328232 A1* | 12/2009 | Safford, III | 726/26 |
| 2013/0024676 A1 | 1/2013 | Glew et al. | |
| 2014/0075556 A1 | 3/2014 | Wicherski | |
| 2014/0082329 A1 | 3/2014 | Ghose | |
| 2015/0095628 A1* | 4/2015 | Yamada et al. | 712/234 |

OTHER PUBLICATIONS

Polychronakis et al., "ROP Payload Detection Using Speculative Code Execution," 6th International Conference on Malicious and Unwanted Software, IEEE, Fajardo, Puerto Rico, Oct. 2011.

Pappas, "kBouncer: Efficient and Transparent ROP Mitigation," Columbia University, New York City, New York, Apr. 1, 2012.

* cited by examiner

HARDWARE-ENABLED PREVENTION OF CODE REUSE ATTACKS

BACKGROUND

The invention relates to systems and methods for protecting computer systems from malware.

Malicious software, also known as malware, affects a great number of computer systems worldwide. In its many forms such as computer viruses, worms, rootkits, and spyware, malware presents a serious risk to millions of computer users, making them vulnerable to loss of data and sensitive information, identity theft, and loss of productivity, among others.

A particular kind of malware consists of a code reuse attack. Some examples of such malware include return-oriented programming (ROP) and jump-oriented programming (JOP) exploits. A typical ROP exploit, also known in the art as a return-into-library attack, includes an illegitimate manipulation of a call stack used by a thread of a process, the illegitimate manipulation intended to alter the original functionality of the respective thread/process. For instance, an exemplary ROP exploit may manipulate the call stack so as to force the host system to execute a sequence of code snippets, known as gadgets, each such gadget representing a piece of legitimate code of the target process. Careful stack manipulation may result in the respective code snippets being executed in a sequence, which differs from the original, intended sequence of instructions of the original process or thread.

A typical JOP attack comprises exploiting a buffer overflow vulnerability to create a dispatch table. Such a dispatch table may be used to re-organize the execution of a legitimate thread or process, by making execution jump from one gadget to another in a pre-determined sequence that carries out a malicious activity instead of the original, intended activity of the targeted process/thread.

By re-using pieces of code from legitimate processes to carry out malicious activities instead of explicitly writing malicious code, ROP and JOP exploits may evade detection by conventional anti-malware techniques. Several anti-malware methods have been proposed to address code-reuse attacks, but such methods typically place a heavy computational burden on the respective host system, negatively impacting user experience. Therefore, there is a strong interest in developing systems and methods capable of effectively targeting code reuse malware, with minimal computational costs.

SUMMARY

According to one aspect, a host system comprises a processor, the processor including a branch counter register configured to store a count of branch instructions occurring within a sequence of instructions executed by the processor, and an inter-branch instruction counter register configured to store a count of instructions occurring between two consecutive branch instructions within the sequence of instructions. The processor further includes a counter control unit connected to the branch counter register, to the inter-branch instruction counter register, and to an instruction decoder module of the processor, the counter control unit comprising hardware logic configured to trigger a switch event within the processor according to a value stored in the branch counter register and according to a value stored in the inter-branch instruction counter register, wherein the switch event causes the processor to switch from executing the sequence of instructions to executing an event handler routine.

According to another aspect, a method comprises employing a branch counter register of a processor of a host system to store a count of branch instructions occurring within a sequence of instructions executed by the processor. The method further comprises employing an inter-branch instruction counter register of the processor to store a count of instructions occurring between two consecutive branch instructions within the sequence of instructions. The method further comprises employing a counter control unit of the processor to trigger a switch event within the processor according to a value stored in the branch counter register and according to a value stored in the inter-branch instruction counter register, wherein the switch event causes the processor to switch from executing the sequence of instructions to executing an event handler routine.

According to another aspect, a non-transitory computer-readable medium stores instructions which, when executed by a processor of a host system, cause the host system to detect a switch event generated within the processor while the processor is executing an instruction sequence, the switch event causing the processor to switch from executing the instruction sequence to executing an event handler routine. In response to detecting the switch event, the host system is further caused to identify a target execution thread according to the instruction sequence, and in response, to determine whether the target execution thread is performing a code-reuse attack. The processor comprises a branch counter register configured to store a count of branch instructions occurring within the instruction sequence, and an inter-branch instruction counter register configured to store a count of instructions occurring between two consecutive branch instructions within the instruction sequence. The processor further comprises a counter control unit connected to the branch counter register, to the inter-branch instruction counter register, and to an instruction decoder module of the processor, the counter control unit comprising hardware logic configured to trigger the switch event according to a value stored in the branch counter register and according to a value stored in the inter-branch instruction counter register.

BRIEF DESCRIPTION OF THE DRAWINGS

The foregoing aspects and advantages of the present invention will become better understood upon reading the following detailed description and upon reference to the drawings where:

FIG. 4-A shows an exemplary hierarchy of software components executing on the host system, the hierarchy comprising a security application operating according to some embodiments of the present invention.

FIG. 4-B shows an alternative software configuration, wherein a security application executes within a virtual machine operating on the host system, according to some embodiments of the present invention.

FIG. 4-C illustrates yet another exemplary software configuration according to some embodiments of the present invention, wherein a security application executes below an operating system.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A process is an instance of a computer program, such as an application or a part of an operating system, and is characterized by having at least an execution thread and a section of virtual memory assigned to it by the operating system, the respective section comprising executable code. Unless otherwise specified, a page represents the smallest unit of virtual memory individually mapped to a physical memory of a host computer system. Unless otherwise specified, a register represents a storage component integrated with a processor, and distinct from random-access memory (RAM). The term "logic" encompasses hardware circuitry having a fixed or a reconfigurable functionality (e.g., field-programmable gate array circuits), but does not encompass software emulating such functionality on a general-purpose computer. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
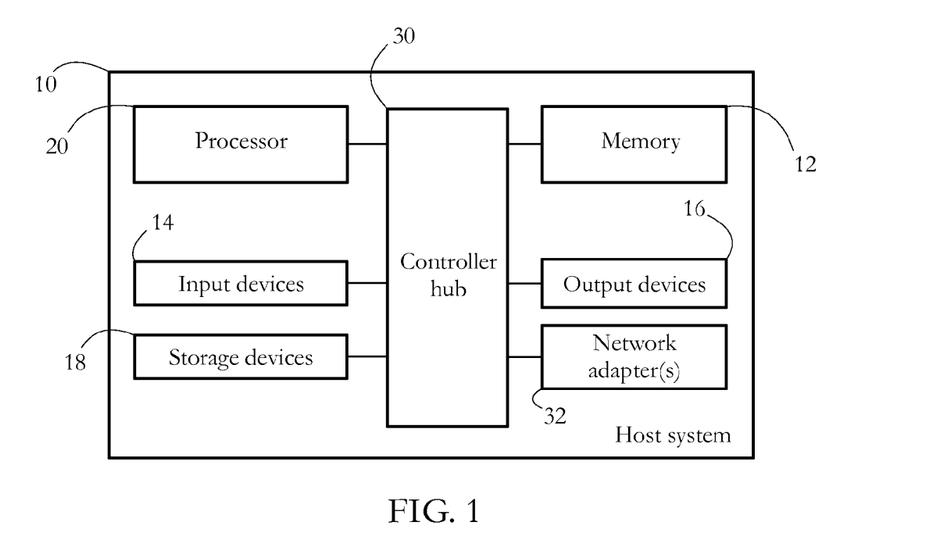
FIG. 1 shows an exemplary hardware configuration of a host system protected from malware according to some embodiments of the present invention.

FIG. 1 shows an exemplary hardware configuration of a host system 10 performing anti-malware operations according to some embodiments of the present invention. Host system 10 may represent a corporate computing device such as an enterprise server, or an end-user device such as a personal computer or a smartphone, among others. Other host systems include entertainment devices such as TVs and game consoles, or any other device having a memory and a processor, and requiring malware protection. Host system 10 comprises a set of physical devices, including a processor 20, a memory unit 12, a set of input devices 14, a set of output devices 16, a set of storage devices 18, and a set of network adapters 32, all connected by a controller hub 30.

In some embodiments, processor 20 comprises a physical device (e.g. multi-core integrated circuit formed on a semiconductor substrate) configured to execute computational and/or logical operations with a set of signals and/or data. In some embodiments, such logical operations are delivered to processor 20 in the form of a sequence of processor instructions (e.g. machine code or other type of software).

Memory unit 12 comprises volatile computer-readable media (e.g. RAM) storing data/signals accessed or generated by processor 20 in the course of carrying out instructions. Memory unit 12 represents data storage components, e.g., memory banks, not integrated with processor 20. Input devices 14 may include computer keyboards, mice, and microphones, among others, including the respective hardware interfaces and/or adapters allowing a user to introduce data and/or instructions into host system 10. Output devices 16 may include display devices such as monitors and speakers among others, as well as hardware interfaces/adapters such as graphic cards, allowing host system 10 to communicate data to a user. In some embodiments, input devices 14 and output devices 16 may share a common piece of hardware, as in the case of touch-screen devices. Storage devices 18 include computer-readable media enabling the non-volatile storage, reading, and writing of software instructions and/or data. Exemplary storage devices 18 include magnetic and optical disks and flash memory devices, as well as removable media such as CD and/or DVD disks and drives. The set of network adapters 32 enables host system 10 to connect to a computer network and/or to other devices/computer systems. Controller hub 30 represents the plurality of system, peripheral, and/or chipset buses, and/or all other circuitry enabling the communication between processor 20 and devices 12, 14, 16, 18, and 32. For instance, controller hub 30 may include a memory controller, an input/output (I/O) controller, and an interrupt controller, among others. In another example, controller hub 30 may comprise a northbridge connecting processor 20 to memory 12 and/or a southbridge connecting processor 20 to devices 14, 16, 18, and 32.

Figure 2:
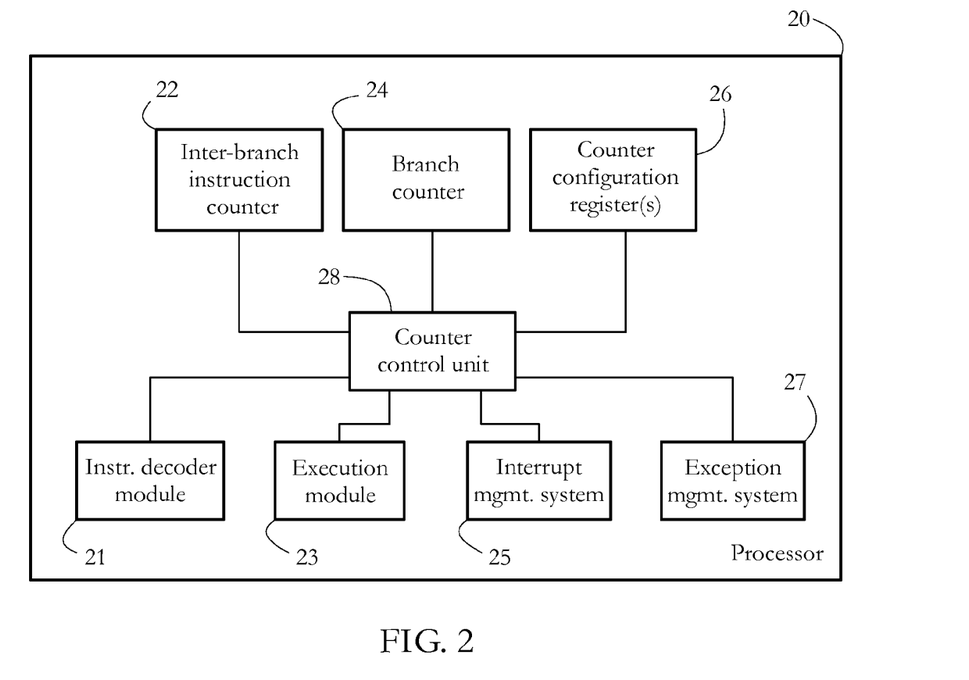
FIG. 2 shows a set of exemplary components of a hardware processor according to some embodiments of the present invention.

FIG. 2 shows exemplary components of processor 20 according to some embodiments of the present invention. Processor 20 may include logic/circuitry configured to carry out various stages of a processor pipeline. For instance, an instruction decoder module 21 may perform instruction decoding operations, while an execution module 23 may perform the execution stage of the pipeline. An interrupt management system 25 and an exception management system 27 generically denote logic configured to manage hardware interrupts and processor exceptions, respectively. Systems 25, 27 may contain multiple subsystems distributed over several processor modules. For instance, system 25 may include a local advanced programmable interrupt controller (LAPIC). Processor 20 may further include logic/circuitry configured to interact with memory 12, for instance to request data from memory 12 and/or to transmit the results of execution of various processor instructions to memory unit 12.

Beside such components, processor 20 may comprise an inter-branch instruction counter 22, a branch counter 24, a set of counter configuration registers 26, and a counter control unit 28 connected to counters 22-24 and to register(s) 26. Hardware components 22-24-26-28 may be used for the prevention of code reuse attacks, as shown in detail below. In some embodiments, counter control unit 28 is further selectively connected to other components of processor 20, such as decoder module 21, execution module 23, and interrupt and exception management systems 25-27, among others. Connecting control unit 28 to decoder module 21 may enable unit 28 to determine whether the current instruction is a branch instruction. A connection to execution module 23 may enable control unit 28 to determine a virtual address of an instruction, e.g., the current value of the instruction pointer—RIP on x86 platforms. A connection to interrupt and exception management systems 25-27 may allow control unit 28 to trigger a processor event, such as an exception, according to the current state of counters 22-24.

In some embodiments, branch counter 24 comprises a processor register configured to store a number representing a count of consecutive branch instructions occurring within a sequence of instructions executed by processor 20. Inter-branch instruction counter 22 may comprise a processor register configured to store a number representing a count of instructions occurring between two consecutive branch instructions counted by branch counter 24. Branch instructions are commonly known in the art as a particular class of processor instructions, which alter the flow of execution. Exemplary branch instructions include calls, jumps, and returns, among others. In some embodiments, counter 24 may selectively count only a subset of branch instructions, hereby termed monitored branch instructions. An exemplary monitored branch instruction is an indirect jump, such as some encodings of the JMP instruction in x86 processors. Counter registers are well known in the art of integrated circuitry, so devices 22 and 24 may be implemented using any method known in the art.

Some hardware platforms feature a hierarchy of software protection domains, also known in the art as layers, protection rings, or privilege rings. Each such layer or ring is associated to a distinct processor privilege level, so that software executing at a certain privilege level cannot directly access resources requiring higher processor privileges. Exemplary rings include ring 0 and ring 3, also termed kernel mode and user mode, respectively. On platforms supporting virtualization, a further privilege level is ring −1, also termed root mode or VMXroot on Intel® systems. In some embodiments, processor 20 includes an instance of counter registers 22-24 for each privilege ring.

In some embodiments, counters 22-24 may be configured to further store an indicator of a memory address, in addition to the respective count of branches or inter-branch instructions. For instance, branch counter 24 may record a memory address (e.g., RIP) of each counted branch instruction, while inter-branch counter 22 may record a memory address (e.g., RIP) of a first instruction of each inter-branch sequence. Such functionality may be implemented in hardware, for instance using a ring buffer with a pre-determined number of entries, e.g., 32 or 64. Saving instruction pointers for each branch may substantially facilitate anti-malware analysis. In such embodiments, security software may no longer need to determine memory addresses of individual code gadgets, but instead retrieve such addresses from the respective processor registers assigned to counters 22-24.

In some embodiments, counter control unit 28 comprises logic/circuitry configured to manipulate the contents of counter registers 22 and/or 24 according to a type of instruction currently in execution. Such manipulations may include, among others, incrementing and/or resetting counters 22-24, and comparing contents of counters 22-24 with a reference value/threshold. Control unit 28 may be further configured to generate a processor event (e.g., an interrupt, an exception, or a virtual machine exit) according to a result of such comparisons. Such processor events, herein called switch events, cause processor 20 to switch from executing a monitored sequence of instructions to executing an event handler routine (e.g., an interrupt handler). Event handlers are typically registered in an interrupt descriptor table (IDT) used by processor 20.

Processor switch events generated by counter control unit 28 may be interpreted by security software executing on host system 10 as triggers for launching an anti-malware analysis of the currently executing software, as shown in more detail below. In one such example, a ROP attack is characterized by frequent branches between various snippets of code, each such snippet ending in a return instruction. Security software may detect such behavior by analyzing the call stack of the currently executing thread, but frequent analysis of the stack may place a substantial computational burden on host system 10, degrading user experience. Instead of performing frequent stack analyses, some embodiments of the present invention may rely on counters 22-24 and on counter control unit 28, to determine precisely when to run the stack analysis. For instance, counter control unit 28 may trigger an exception when the count of consecutive jumps exceeds a predetermined threshold, signaling to security software that suspicious activity is currently occurring on the call stack. More details of such functionality are given below, in relation to FIGS. 5 and 6.

Figure 3:
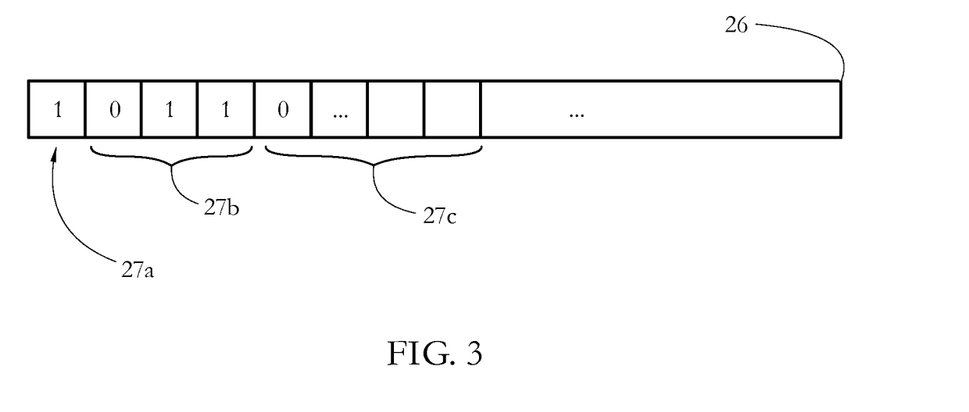
FIG. 3 shows a diagram of an exemplary counter configuration register according to some embodiments of the present invention.

In some embodiments, counter configuration register(s) 26 comprise processor registers configured to store values of various parameters used for branch monitoring. A diagram of an exemplary counter configuration register is shown in FIG. 3. Register 26 includes a set of fields 27a-c, for instance bit fields, each such field capable of storing a value indicative of a configuration option. Some fields 27a-c may be writable by software, such as the operating system or a hypervisor executing below the operating system, thus allowing customized software control over branch monitoring.

An exemplary field 27a may store an on/off flag indicating whether branch monitoring is currently active or not. Such an indicator may be used by processor 20 to decide whether to update counters 22-24 for the current execution context. In some embodiments, register(s) 26 may store such a flag for each of a plurality of processor privilege rings. In one such example, one bit of field 27a may indicate whether branch monitoring is on or off for processes/threads executing in kernel mode (ring 0), while another bit may indicate whether branch monitoring is on or off for processes/threads executing in user mode (ring 3).

Another exemplary field 27b of register(s) 26 may instruct processor 20 to turn branch monitoring on or off upon occurrence of certain processor events, irrespective of the current value of other fields or flags. For instance, a bit of field 27b may indicate whether to turn branch monitoring off when a hardware interrupt occurs. A practical utility of this approach may be to allow for thread-specific branch monitoring. In one such example, branch monitoring may be turned off during execution of an interrupt handler routine, and re-activated when processor 20 returns to the execution context of a targeted thread.

Another field 27c of configuration register(s) 26 may store an identifier of a monitored branch instruction. Such identifiers indicate to processor 20 which instructions should be considered as monitored branches, and therefore counted by branch counter 24, as shown in more detail below. Some exemplary monitored branch instructions include indirect JMP, indirect CALL, and RET instructions on x86 platforms. In some embodiments, only certain variants of the instructions are monitored, according to their parameter usage and instruction encoding.

In some embodiments, configuration register(s) 26 may further include fields storing a first threshold value and a second threshold value. Such threshold values may indicate, for instance, a maximum number of monitored branches, and a maximum number of inter-branch instructions, and may be used by processor 20 while manipulating counters 22-24 (see below, in relation to FIG. 5).

Another exemplary field of register(s) 26 stores an address of a memory section used for saving the current state of counters 22-24, for instance, when a change of execution context occurs. Such fields may be writable by software executing on host system 10, e.g., by the operating system. In some embodiments, register(s) 26 may comprise dedicated fields for storing counter values, such as current values of counters 22-24. Processor 20 may be configured to save current values of counters 22-24 to such register fields, for instance, upon a change of execution context, and to read such values from the respective fields when returning to the original execution context. In an embodiment employing virtualization (see e.g., FIGS. 4-B-C), processor 20 may save the state of counters to an area dedicated to storing a virtual machine control structure (VMCS) used to manage each virtual machine executing on host system 10. More details about saving and/or restoring counter states are given below, in relation to FIG. 7.

Figure 4:
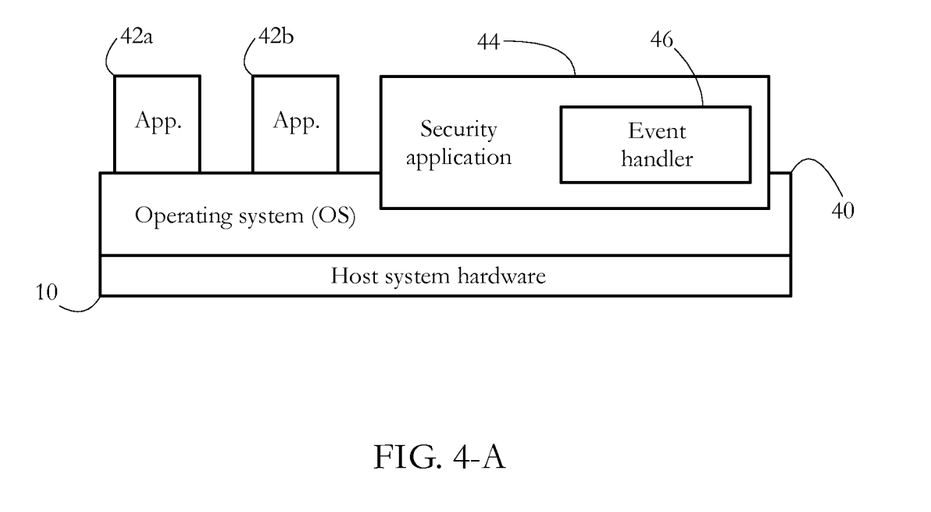

FIG. 4-A shows an exemplary software configuration of host system 10. An operating system (OS) 40 provides an interface between a set of software applications and the hardware devices of host system 10. OS 40 may comprise any widely available operating system such as Windows®, MacOS®, Linux®, iOS®, or Android™, among others. A set of exemplary applications 42a-b generically represent any application such as word processing, image processing, media player, database, calendar, personal contact management, browser, gaming, voice communication, and data communication applications, among others. In some embodiments, host system 10 further operates a security application 44 configured to protect host system 10 from malware, including code reuse attacks. In one example, security application 44 includes software components capable of analyzing a call stack of a target process, to determine whether the target process is subject to a ROP exploit. In another example, application 44 includes software capable of analyzing a plurality of code snippets (e.g., gadgets), to determine whether such snippets are used in a JOP exploit. Application 44 may be configured to take advantage of hardware features of processor 20, such as counters 22-24 and counter control unit 28. For instance, application 44 may include an event handler 46 configured to detect the occurrence of a processor switch event generated by counter control unit 28, and in response to detecting the switch event, to instruct application 44 to perform a code reuse analysis of the currently executing thread.

FIG. 4-B shows an alternative software configuration of host system 10, wherein a security application executes within a virtual machine. In some embodiments, a hypervisor (HV) 34 executes on host system 10 and to exposes a set of guest virtual machines (VM) 50a-b. Each virtual machine 50a-b comprises a software abstraction, for instance an emulation, of an actual physical computing device, the abstraction enabling the respective VM to execute an operating system 40a-b and/or a set of software applications, as if the respective VM possessed a set of physical hardware devices. In some embodiments, hypervisor 34, also known in the art as a virtual machine monitor (VMM), comprises software which creates the virtual environment of each guest VM 50a-b, an operation known in the art of virtualization as exposing the respective VM. Exposing a VM may include creating a plurality of virtual devices, each virtual device emulating the operation and functionality of a physical hardware device of host system 10, such as a processor and a memory controller, among others. Hypervisor 34 may further assign a set of virtual devices to each exposed VM. Examples of popular hypervisors include the VMware ESXi™ from VMware Inc. and the open-source Xen hypervisor, among others.

In some embodiments, hypervisor 34 takes control of processor 20 at the most privileged level (e.g., VMXroot on Intel® platforms supporting virtualization, also known generically as ring −1 or root mode). Most components of OSs 40a-b execute at a privilege level typically known as ring 0 or kernel-mode, less privileged than hypervisor 34. From this perspective, hypervisor 34 is sometimes said to execute below OSs 40a-b or below VMs 50a-b. Applications 42c-e typically execute with lesser processor privileges than OSs 40a-b, for instance in ring 3 or user-mode. Applications executing on a virtualized processor of a virtual machine are said to execute within the respective VM. In contrast, hypervisor 34 is said to execute outside VMs 50a-b.

In the embodiment illustrated in FIG. 4-B, a security application 144 executes within guest VM 50b, protecting VM 50b from code-reuse attacks, using methods described in more detail below. There may be a security application executing within each VM exposed by hypervisor 34, each such security application protecting the respective VM. Alternatively, one such security application may protect multiple guest VMs executing on host system 10. In such embodiments, inter-VM communication necessary for anti-malware operations may be managed by hypervisor 34.

In some embodiments, an event handler 146 executes below OSs 40a-b, at a processor privilege level similar to that of hypervisor 34. Handler 146 may be incorporated into hypervisor 34, or may be installed as a separate component. Event handler 146 may be configured to detect the occurrence of a processor switch event generated by counter control unit 28 of processor 20, and in response, to instruct security application 144 to perform a code reuse analysis of a thread executing within guest VM 50b. To enable interception of the switch event by handler 146, counter control unit 28 may be configured to generate a virtual machine exit event, such as a VMExit on Intel® platforms supporting virtualization. In some embodiments, VM exit events suspend the execution of in-VM code and transfer control of processor 20 to hypervisor 34. Such transfer of control may allow event handler 146 to detect the occurrence of the switch event.

Upon detecting the switch event, handler 146 may need to signal to application 144 to launch the code reuse analysis routines. Transmission of messages and/or data from below the operating system to components executing within a virtual machine may be achieved using several methods known in the art of virtualization. In one example, handler 146 may inject an interrupt into guest VM 50b in response to detecting the occurrence of the switch event. Security application 144 may comprise an interrupt handler configured to intercept the respective interrupt, thus receiving notification of the switch event.

FIG. 4-C shows yet another exemplary software configuration allowing protection of host system 10 from code reuse attacks according to some embodiments of the present invention. In the example of FIG. 4-C, hypervisor 34 exposes a set of guest VMs 50c-d, each such guest VM executing an operating system 40c-d, respectively, and a set of applications 42f-g, respectively. A security application 244 including an event handler 246 executes below guest VMs 50a-b, at a processor privilege level similar to that of hypervisor 34. Security application 244 may be configured to protect guest VMs 50a-b from code reuse attacks using methods described below. Event handler 246 may detect the occurrence of a processor switch event generated by counter control unit 28 (FIG. 2) and in response, signal to security application 244 to perform a code reuse analysis of a thread executing within either of guest VMs 50c-d.

Placing security application 244 and/or event handler 246 outside the protected VM(s) may increase the security of host system 10. Malware executing within VMs 50c-d may attempt to incapacitate malware defense mechanisms, for instance, by de-activating code-reuse analysis and/or interception of switch events, or by rendering the event handler incapable of communicating with the security application. Virtual machines typically operate with virtualized physical memory spaces, each such space isolated from the memory spaces of other VMs and from the memory space used by hypervisor 34. Memory isolation may thus protect components such as application 244 from malware executing within guest VMs 50c-d.

However, placing malware defense software, such as application 244 and/or event handler 246, outside the protected VMs may complicate malware detection by introducing an extra layer of complexity. Although possible, operations such as determining memory addresses of various software objects and intercepting various events (e.g., system calls, etc.) are more complicated and computationally demanding to perform from the level of hypervisor 34 than from within the respective VM. Therefore, some embodiments may achieve a compromise between security and simplicity by including a software component, such as security agents 48a-b in FIG. 4-C, within each protected VM. Agents 48a-b may include modules with minimal functionality, configured to perform operations which are rather difficult to carry out from outside the respective VM, and to communicate key data to security application 244. To transfer data (e.g. memory addresses of software objects) from within a VM, some embodiments may configure the security agent to write the respective data to a pre-determined memory location, and then trigger a VM exit event to signal that new data is available. Security application 244 may then intercept the VM exit event, and in response, read the data from the respective memory location.

Figure 5:
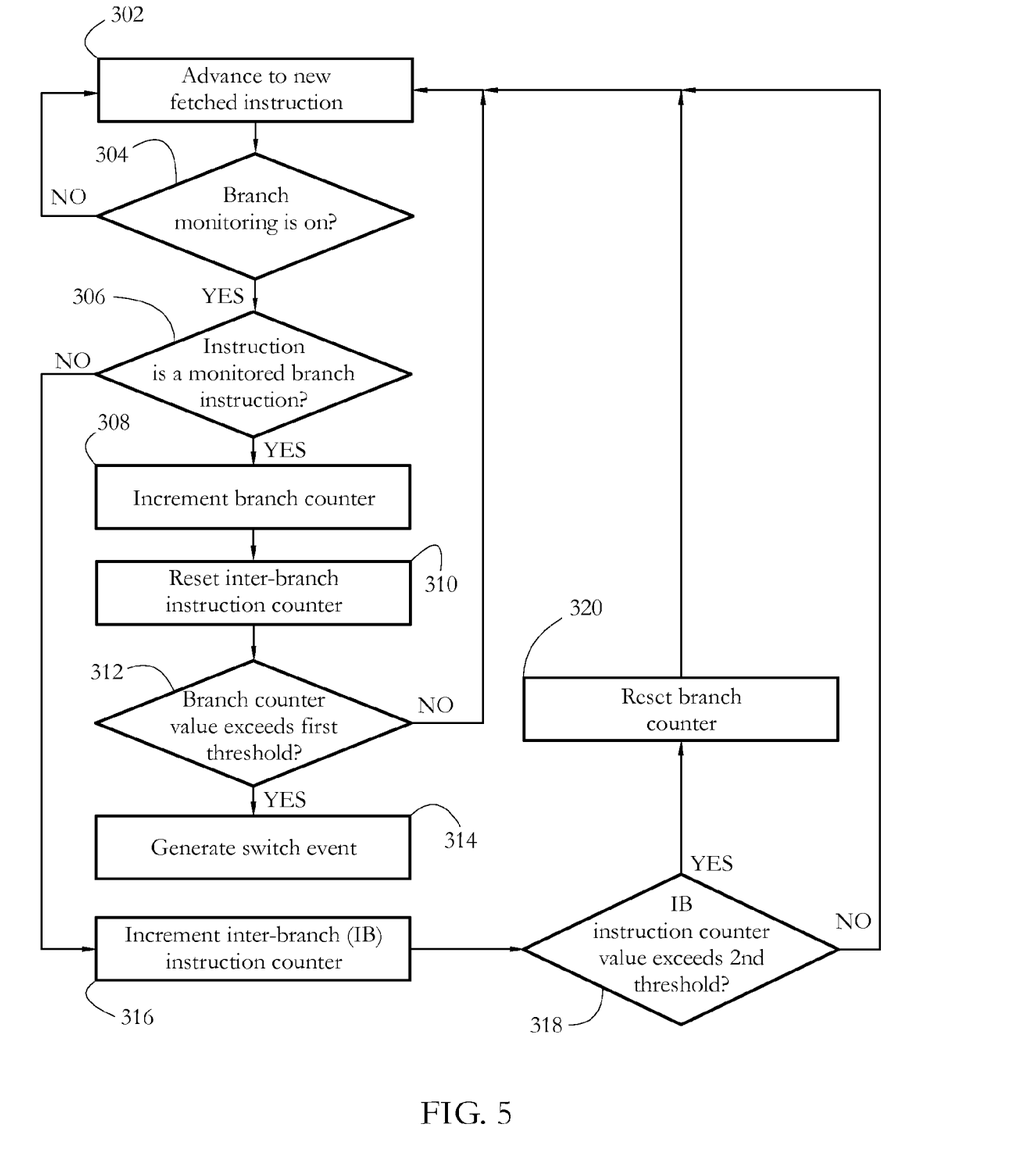
FIG. 5 shows an exemplary sequence of steps performed by the processor to carry out branch monitoring, according to some embodiments of the present invention.

FIG. 5 shows an exemplary sequence of steps performed by processor 20 to carry out branch monitoring according to some embodiments of the present invention. The illustrated sequence of steps may be included within the processor pipeline, for instance, at the execution stage, following instruction fetching and decoding. Other embodiments may implement various steps at other stages of the pipeline.

A step 304 determines whether branch monitoring is currently on, and when no, processor 20 may advance to the next fetched instruction (step 302). Branch monitoring may be turned off for a variety of reasons, such as hardware interrupts and changes of execution context. More details on how processor 20 and/or software may toggle branch monitoring on/off are given below, in relation to FIG. 7. Step 304 may comprise looking up a value of a flag bit within counter configuration register(s) 26. Processor 20 may further consider whether a processor event (such as a hardware interrupt) has recently occurred, and when such an event has occurred, to determine whether the occurrence of the event should affect branch monitoring.

When branch monitoring is on, a step 306 may determine whether the current processor instruction is a monitored branch instruction. In some embodiments, security application 44 may be interested in monitoring a particular category of instructions, which may be used in code reuse attacks. For instance, ROP exploits rely on executing a succession of code snippets, each snippet ending in a return instruction (e.g., indirect RETN or RETF on x86 platforms). In contrast, JOP exploits rely on repeated jump instructions (e.g., indirect JMP on x86 platforms) to redirect execution among code snippets. Some embodiments include return and jump instructions as monitored branch instructions, to enable processor 20 to count occurrences of such instructions in the course of execution. In some embodiments, monitored branch instructions include indirect jump instructions, such as JMP and CALL among others, wherein the destination address is read from a memory address or from a processor register. An example of such indirect jump is JMP r, wherein r denotes one of the processor registers (e.g., eax). Some embodiments use a dedicated field of counter configuration register(s) 26 (FIG. 2) to indicate which instructions should be treated as monitored branch instructions. Step 306 may include looking up the contents of register(s) 26.

When the current instruction is a monitored branch instruction, in a sequence of steps 308-310, counter control unit 28 may increment branch counter 24 and reset inter-branch instruction counter 22 to zero. In some embodiments, in step 308, processor 20 may save a memory address of the current instruction (e.g., RIP value) to a predetermined location, such as a dedicated internal stack or circular buffer of the CPU.

Next, in a step 312, counter control unit 28 may compare the current value stored in branch counter 24 to a pre-determined threshold (e.g., 7). The branch count threshold value may be written by software, such as security application 44 or OS 40, into a dedicated field of counter configuration register(s) 26, and read by unit 28 from register(s) 26. When the value currently stored in branch counter 24 does not exceed the threshold, processor 20 may advance to the next fetched instruction (step 302). When the value exceeds the branch count threshold, in a step 314, counter control unit 28 may generate a processor switch event, for instance by sending a signal to interrupt and/or exception management systems 25-27 of processor 20 (FIG. 2). Such a switch event may be used to signal to software, such as security application 44, that a code reuse analysis is opportune.

Exemplary switch events include interrupts, exceptions, and VM exit events, among others. The type of event generated in step 314 may vary among embodiments. Exception types may include fault, trap, and abort. Interrupts typically occur in response to signals from hardware devices apart from processor 20, but some interrupts may be generated internally, for instance by a LAPIC of processor 20. Some types of switch events may be injected at specific stages of the processor pipeline (e.g., an invalid opcode exception is generated at the decode stage, while a page fault is generated in response to an execution attempt).

When the current instruction is not a monitored branch instruction (step 306 above), a step 316 may increment inter-branch instruction counter 22. Some embodiments may also save a memory address (e.g., RIP) of the current instruction to a pre-determined location. Next, in a step 318, counter control unit 28 may compare the value currently stored in inter-branch instruction counter 22 with a second threshold, which may differ in value from the branch count threshold used in step 312. The second threshold may indicate an upper limit (e.g., 4 instructions) for the length of a snippet of code separating two consecutive monitored branch instructions. When the current value stored by inter-branch instruction counter 22 does not exceed the second threshold, processor 20 may advance to the next fetched instruction (step 302).

In some embodiments, when the length of a snippet of code between two consecutive monitored branch instructions exceeds a certain length (e.g., 4 instructions), the respective snippet is not considered likely to participate in a code reuse attack. Therefore, in some embodiments, when the value stored by inter-branch instruction counter 22 exceeds the second threshold, a step 320 resets branch counter 24 to zero. Overall, the sequence of steps illustrated in FIG. 5 triggers a switch event (step 314) only when processor 20 executes a sufficiently long succession (e.g., at least 7) of sufficiently short (e.g., at most 4 instructions) code snippets, each such code snippet bounded by monitored branch instructions. Such situations are consistent with ROP/JOP attacks, wherein multiple relatively small code snippets are chained together via branch instructions such as JMP, CALL, or RET.

Figure 6:
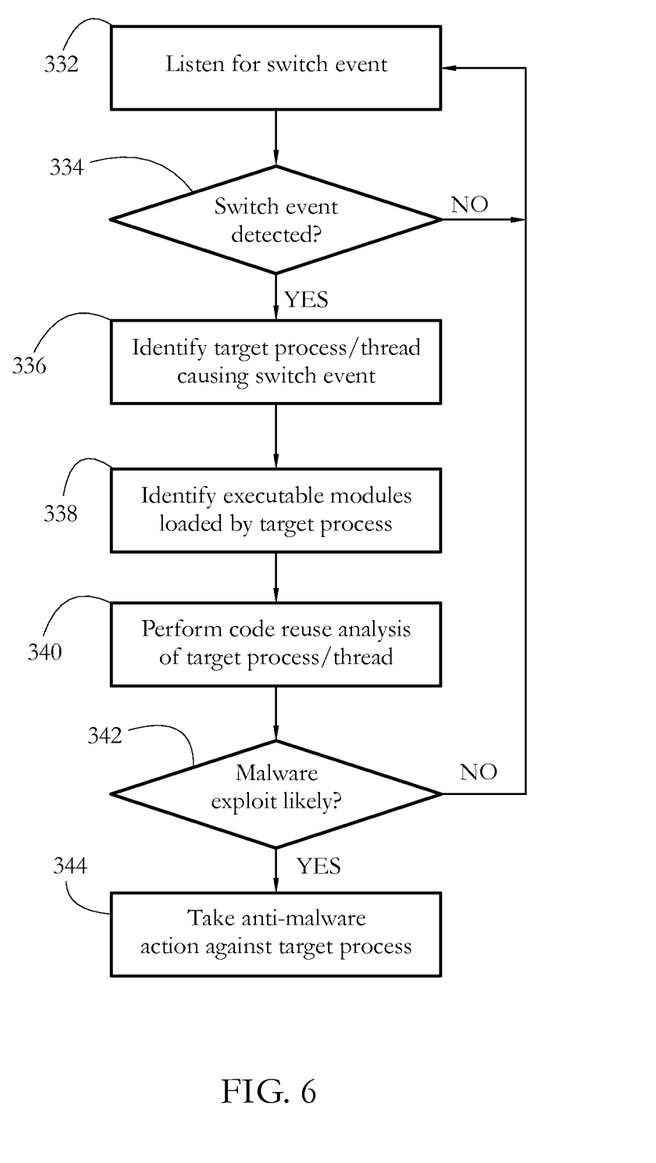
FIG. 6 shows an exemplary sequence of steps performed by the security application according to some embodiments of the present invention.

FIG. 6 shows an exemplary sequence of steps performed by security application 44 (or instances 144 or 244 in FIGS. 4-B-C) to carry out malware protection according to some embodiments of the present invention. A sequence of steps 332-334 may listen for the occurrence of a processor switch event triggered by counter control unit 28 (step 314 above). When a switch event is detected, for instance by event handler 46, security application 44 identifies a target process and/or target thread as the process/thread which was executing when the switch event was triggered. In a step 338, security application 44 may further identify a set of executable modules loaded by the target process. Unless otherwise specified, an executable module is a component or a building block of a process; each such module comprises executable code. Exemplary executable modules include a main executable of a process (such as an EXE file in Windows®), and a shared library (such as a dynamic-linked library—DLL), among others. In some embodiments, the main executable module of a process comprises the first processor instruction of the process, executed when the respective process is launched. Libraries are self-contained sections of code implementing various functional aspects of a program. Shared libraries may be used independently by more than one program. Similar kinds of executable modules may be identified in host systems 10 executing operating systems such as Linux®, or MacOS®. Executable modules may be loaded and/or unloaded to/from memory during the launch and/or execution of the respective process.

In some embodiments, step 338 further includes determining a virtual and/or physical memory address (also termed base address) of each loaded module. Such memory addresses may point to a section of memory holding executable code and/or data of the respective module. Determining such memory addresses may comprise any method known in the art, such as parsing data structures employed by the operating system to represent currently executing processes and/or threads (e.g. EPROCESS and PEB data structures in a Windows environment).

In an embodiment as illustrated in FIG. 4-C, wherein security application 246 executes outside the protected virtual machine, steps 336 and 338 may be performed by the respective security agents 48a-b, which may then communicate data such as memory addresses, etc., to security application 246 by any method known in the art of virtualization.

In a step 340, security application 44 performs a code reuse analysis of the target thread. When the analysis reveals that the target thread is likely to be subject to a malware attack, in a step 344, security application 44 may take anti-malware action against the target process/thread. Exemplary anti-malware actions include stopping or restricting the execution of the target process, quarantining the target process, and notifying a user of host system 10, among others.

Several methods are known in the art for determining whether the target thread is subject to a code reuse attack, such as a ROP or JOP exploit. In one example, pertaining to ROP exploits, security application 44 may analyze the call stack of the target thread in response to detecting the switch event triggered by counter control unit 28. Analyzing the stack may include identifying items on the stack, which point to addresses within an executable module loaded by the target process. To determine whether a stack item points to a loaded module, application 44 may use data determined in steps 336-338 (see above). In some embodiments, counter control unit 28 may save memory addresses (e.g., values of the instruction pointer, or RIP) of branch and/or inter-branch instructions. When this mechanism is enabled, security application 44 may retrieve such addresses directly from a dedicated location, such as a dedicated internal stack or circular buffer of the CPU. Next, security application 44 may determine whether the target thread is subject to a ROP exploit according to a count of such stack items pointing to short snippets of code, commonly termed ROP gadgets. A more detailed example is shown below, in relation to FIGS. 7-8.

In another example, relevant to JOP exploits, security application 44 may analyze a sequence of branches counted by counters 22-24. A typical JOP attack relies on a gadget dispatcher using a dispatch table to redirect execution from one snippet of code (termed gadget) to another. The dispatch table may be injected into the memory space of a target process, for instance via a buffer overflow. An exemplary branching pattern of a JOP attack may include a sequence:

dispatcher→gadget 1→dispatcher→gadget 2→dispatcher→gadget 3→ . . .

In an embodiment where processor 20 is configured to save addresses (e.g., RIP) of branch and inter-branch instructions, security application 44 may search such records, looking for an indication of a scenario wherein execution repeatedly returns to the same address (possibly a dispatcher). Another exemplary approach to JOP detection includes analyzing the address of each gadget, to determine whether the address represents the beginning of a function. Legitimate branches typically redirect execution to the beginning of a function (e.g., a subroutine performing a specific task), while JOP gadgets are located randomly within the body of the function. Therefore, a branch destination address located somewhere within a function may be indicative of JOP.

Successful code reuse analysis may rely on the ability of processor 20 and/or security application 44 to perform thread-specific branch monitoring, i.e., to monitor only branches and inter-branch instructions belonging to a specific thread or process. In modern hardware and operating systems, execution is prone to frequent context switches, which change the processor from executing one thread to executing another thread. Some context switches may occur, for instance due to scheduling. Other context switches are caused by hardware interrupts and other processor events, which suspend execution of the current thread, and switch the processor to executing an interrupt handler routine. In host systems employing hardware virtualization, a particular type of context switch transfers control of the processor between the hypervisor and a virtual machine.

Some embodiments of the present invention may be configured to perform context-specific branch monitoring. Such functionality may be achieved, for instance, by enabling the processor to switch branch monitoring on or off in response to various processor events, and/or in response to context changes. Switching branch monitoring on and off may be achieved by setting a flag of configuration register(s) 26 to 1 or 0, respectively. The respective value may be used by processor 20 in step 304 (FIG. 5) to determine whether to update counters 22-24 for the currently executing thread. Processor 20 may thus handle various code reuse analysis scenarios. For instance, processor 20 may be configured to monitor only code executing in ring 3 (user mode), by switching branch monitoring off while executing in ring 0 (kernel mode). In another example, processor 20 may be configured to turn branch monitoring off in response to a hardware interrupt, and to resume branch monitoring when returning from the interrupt handler (e.g., in response to an IRET on x86 platforms). In yet another example, branch monitoring may be turned off in response to a VM exit processor event.

Figure 7:
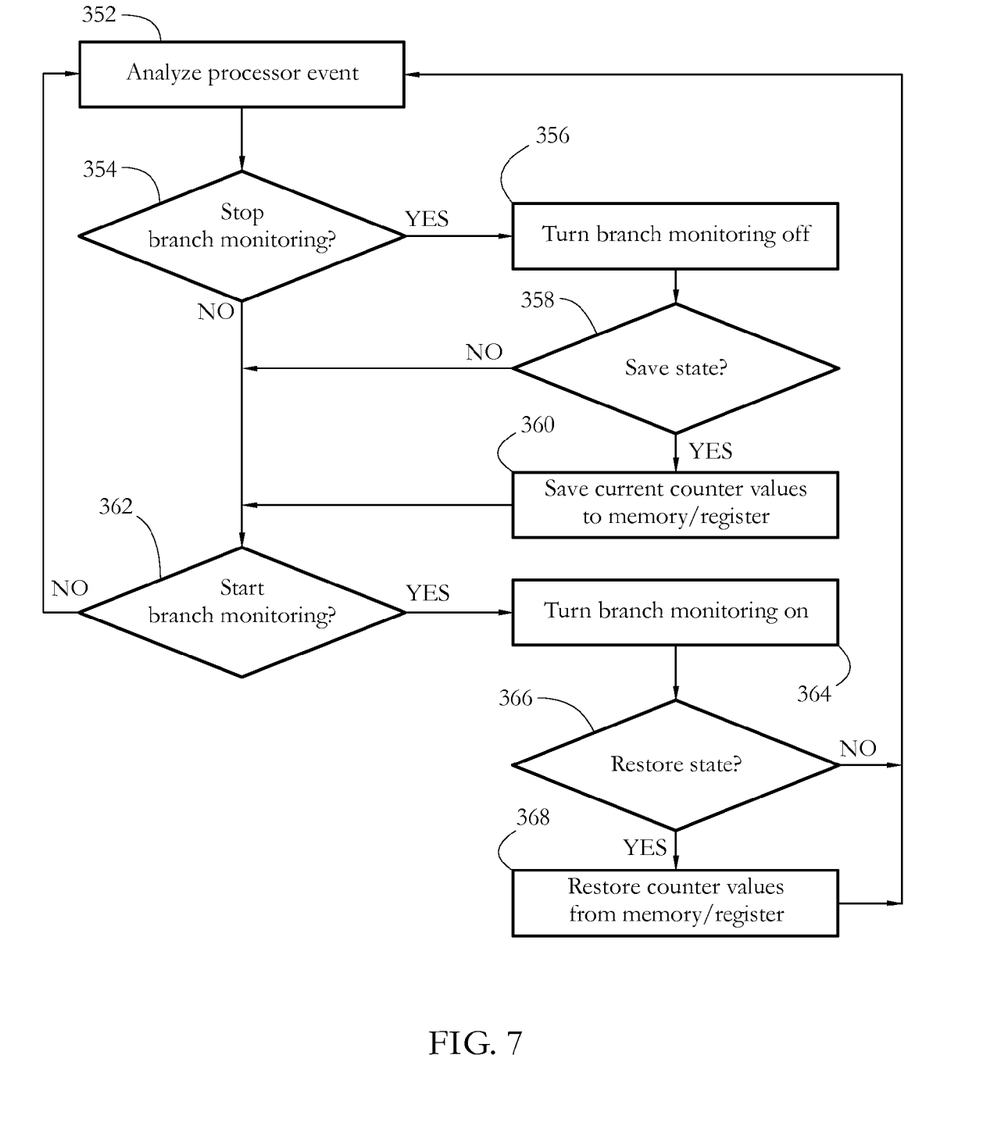
FIG. 7 shows an exemplary sequence of steps performed by the processor to manage branch monitoring in response to processor events such as interrupts and changes of execution context, according to some embodiments of the present invention.

FIG. 7 illustrates an exemplary sequence of steps carried out by processor 20 to manage branch monitoring in response to processor events such as hardware interrupts and changes of execution context, according to some embodiments of the present invention. When a processor event occurs, a step 352 analyzes the respective event, for instance to identify a type of the event (e.g., change of processor privilege level, hardware interrupt, VM exit, etc.). In a step 354, processor 20 may determine whether to stop branch monitoring in response to the current event, using either one or a combination of decision criteria. In some embodiments, a configuration register, such as register(s) 26 (FIG. 2) may store a set of flags instructing processor 20 to stop branch monitoring when a hardware interrupt occurs, and to resume branch monitoring when execution returns from the respective interrupt handler. Resuming branch monitoring may be triggered, for instance, by an IRET instruction signaling that the interrupt handler has finished. Another exemplary flag may instruct processor 20 not to perform branch monitoring when executing in ring 0 (kernel mode). In such configurations, when encountering an event such as a system call, consistent with a transition from ring 3 (user mode) to kernel mode, processor 20 may turn branch monitoring off, and resume branch monitoring when execution returns to ring 3.

In a step 358, processor 20 may determine whether to save the state, and when yes, a step 360 saves the values currently stored in counters 22-24 to a predetermined memory location or to a processor register. Saving counter values may facilitate context-specific branch monitoring, for instance by allowing processor 20 to suspend monitoring a first thread, switch to monitoring another thread, and then resume monitoring the first thread without losing the already determined counter values. In some embodiments, saving the state is performed by software, such as the operating system or hypervisor, which may read and/or write from/to counters 22-24 whenever the state needs to be saved or restored.

In a step 362, processor 20 may determine whether to start branch monitoring according to the latest processor event, and when yes, turn branch monitoring on in a step 364. Such a situation may arise, for instance, when processor 20 switches from executing an interrupt handler routine to executing the target thread. The decision to resume branch monitoring may be taken according to values stored in configuration register(s) 26. In a step 366, processor 20 determines whether to restore counters 22-24 to previously saved states, and when yes, a step 368 copies saved values from memory or a processor register into counter(s) 22-24. In some embodiments, restoring the state is performed by software, such as the operating system or hypervisor.

Figure 8:
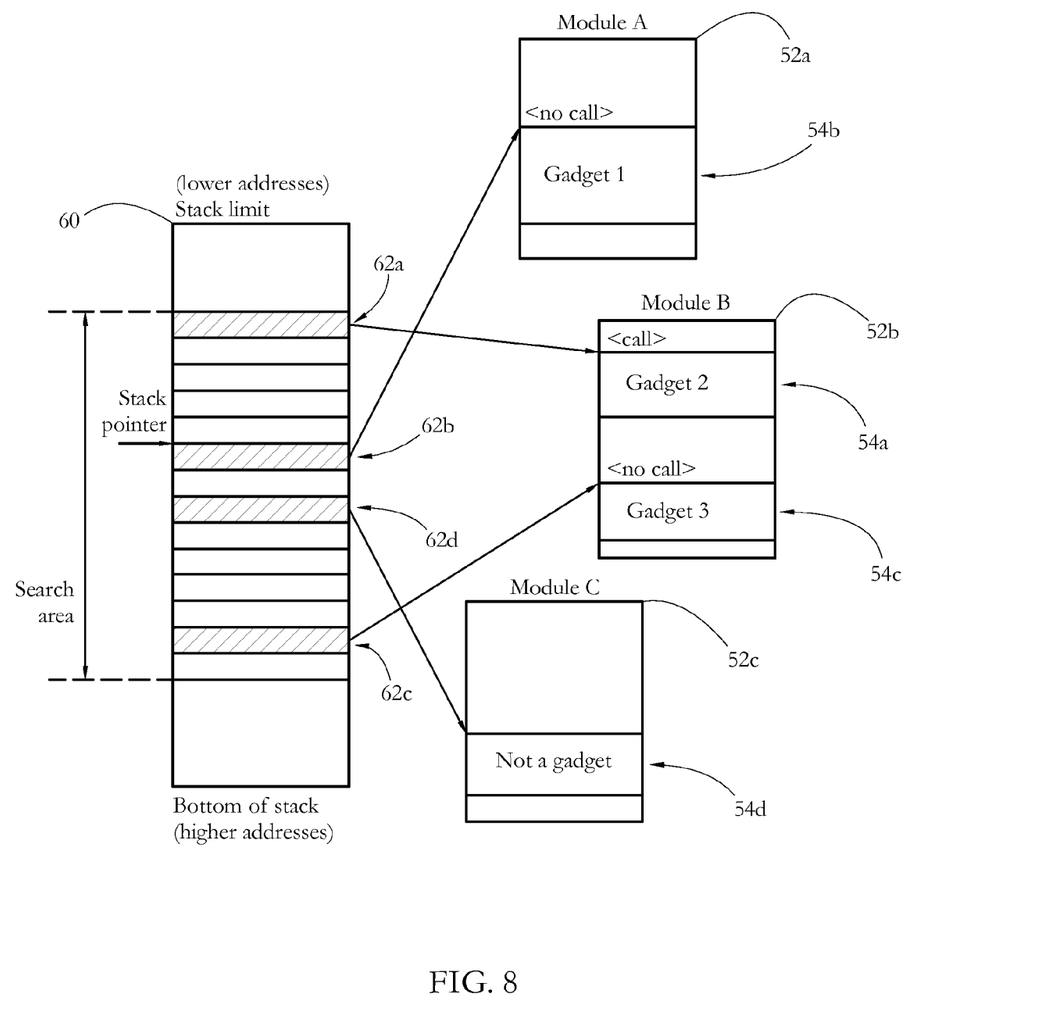
FIG. 8 illustrates an exemplary stack of a thread executing on the host system, the stack comprising a plurality of references, each pointing to a snippet of code of a loaded executable module. Some illustrated snippets may be identified as ROP gadgets.

FIG. 8 schematically illustrates an exemplary code reuse analysis, which may be performed by security application 44 (step 340 in FIG. 6) in response to intercepting processor switch event triggered by counter control unit 28. The example shown in FIG. 8 applies to detecting ROP exploits, wherein code reuse analysis comprises an analysis of a call stack 60 of a target thread. Exemplary stack 60 includes a plurality of references 62*a-d*, each reference pointing to a code snippet within a loaded executable module 52*a-c*, such as a DLL. In some embodiments, code-reuse analysis may comprise determining whether such snippets are ROP gadgets, i.e., relatively short sequences of instructions followed by a return instruction. In some embodiments, a decision whether a sequence of instructions is a ROP gadget is made according to a count of instructions preceding a return instruction, and/or according to a type of instruction found within the respective sequence. For instance, in some embodiments, when a sequence contains a CALL instruction, the respective sequence is not considered a ROP gadget. In the example of FIG. 7, snippets 54*a-c* are ROP gadgets, while snippet 54*d* is not a ROP gadget.

In some embodiments, code reuse analysis may further determine whether the reference to each identified ROP gadget was pushed on the stack as part of the original functionality of the target thread/process, as opposed to an exploit. Security application 44 may, for instance, inspect the instruction immediately preceding the respective ROP gadget in the memory space of the respective module, to determine whether the instruction comprises a call resulting in the selected gadget reference being pushed onto the stack. In some embodiments, a call pushing the reference to the ROP gadget onto the stack, the call immediately preceding the ROP gadget, indicates a legitimate call. In the example of FIG. 8, ROP gadget 2 is preceded by a legitimate call, whereas gadgets 1 and 3 are not. Gadgets 1 and 3 may therefore be identified as suspect. In some embodiments, security application 44 may determine whether the target thread is subject to a ROP exploit according to a count of suspect ROP gadgets identified within the call stack of the target thread, or according to a count of suspect ROP gadgets within the same loaded executable module.

Figure 9:
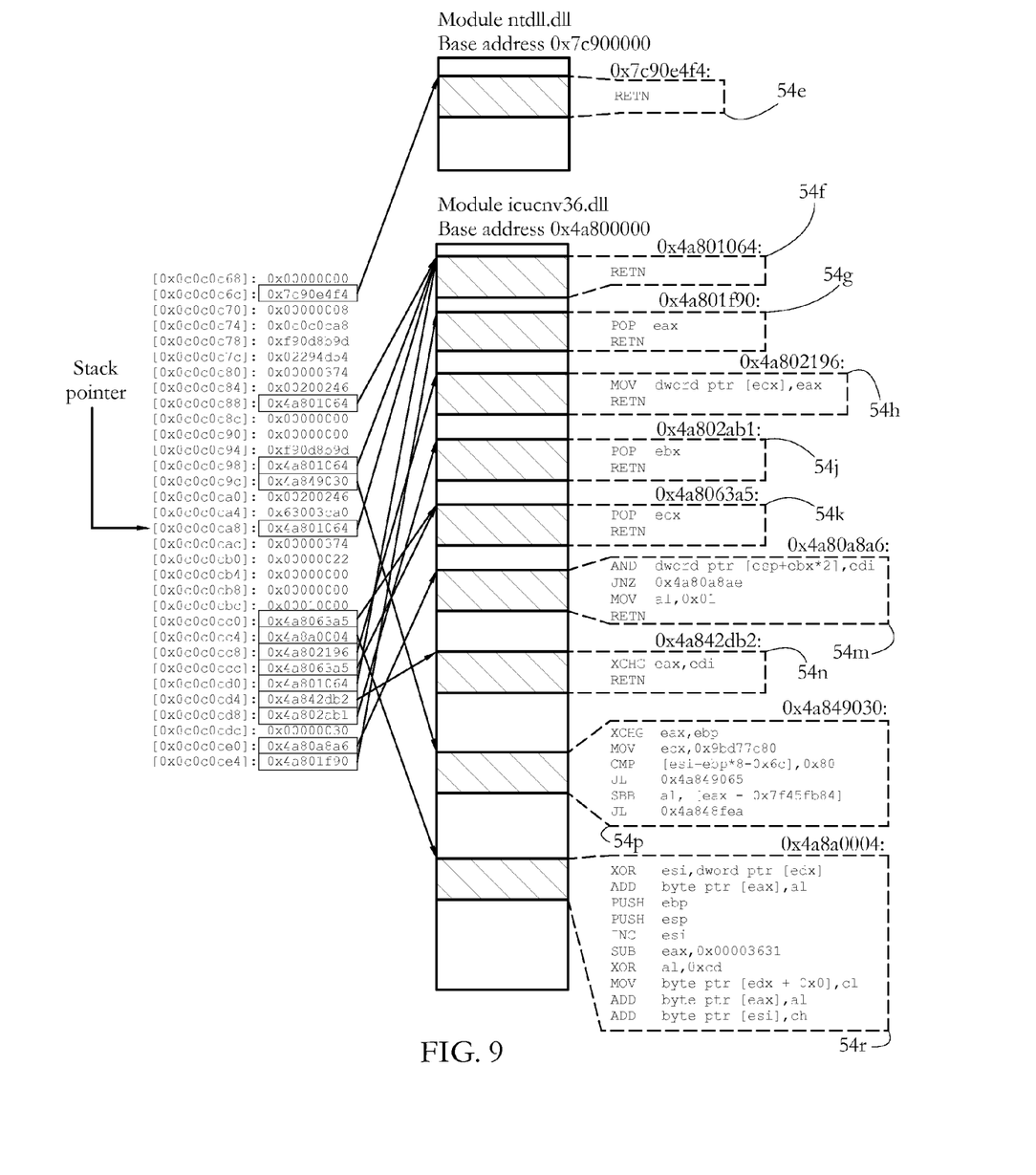
FIG. 9 illustrates an exemplary stack of a thread subject to an ROP exploit, according to some embodiments of the present invention.

FIG. 9 shows an exemplary stack of a thread subject of a ROP exploit. References are represented within rectangular boxes. The contents of each section of memory pointed to by a reference were disassembled and shown as a sequence of instructions 54*e-r* found within the respective section of memory. Sections 54*p-r* do not contain ROP gadgets. In contrast, sections 54*e-n* contain ROP gadgets.

The exemplary systems and methods described above allow protecting a host system from malicious code-reuse software, such as ROP and JOP exploits. In some embodiments, a processor of the host system is endowed with two counter registers, configurable to store a count of branch instructions and a count of inter-branch instructions, respectively, occurring within a stream of instructions fetched by the processor for execution. In some embodiments, branch instructions include instructions such as JMP and CALL on x86 platforms, while inter-branch instructions are instructions executed between two consecutive branch instructions. The processor may be further configured to generate a processor event, such as an exception or interrupt, when a value of a counter exceeds a predetermined threshold. Such processor events may be used as triggers for launching a malware analysis to determine whether the host system is subject to a code reuse attack.

Code reuse analysis typically includes suspending an executing thread to analyze thread-specific data structures, such as the call stack and executable modules (e.g., DLLs) loaded by a process owning the respective thread. Such analyses may place a substantial computational burden on the host system, with negative impact on user experience. Some conventional anti-malware systems and methods employ a malware-indicative event as a trigger for launching a code reuse analysis, thus trying to minimize the frequency of such analyses. Exemplary trigger events used in conventional core reuse protection include, among others, a system call, such as a SYSCALL instruction on Intel® platforms, switching the processor from executing in user mode (e.g., ring 3) to executing in kernel mode (e.g., ring 0).

However, system calls may be executed quite frequently as part of legitimate software functionality. Using such events as triggers may therefore result in a substantial rate of false alarms and unnecessary computation. Instead of using such trigger events, some embodiments of the present invention use hardware-implemented counters to monitor the branching behavior of currently executing code, and trigger code reuse analysis only when counter values suggest the likelihood of a malware attack. In one such example, the processor may be configured to generate an exception when it detects the execution of a chain of short code snippets mutually connected via branch instructions (e.g., JPM, CALL, RET, etc.). Such behavior may be indicative of a code-reuse attack, for instance of a ROP or JOP exploit. The exception generated by the processor upon detecting such behavior may be used as a trigger for launching a code reuse analysis, e.g., an analysis of the call stack.

Conventional code reuse analysis is further complicated by occasional context switches, wherein the processor changes from executing one thread to executing another thread. Context switches occur, for instance, due to thread scheduling and hardware interrupts, among others. When context switches occur, security-relevant data structures such as the call stack may end up with mixed data from multiple execution contexts. In contrast, some embodiments of the present invention are configurable to perform thread-specific branch monitoring. In one such example, the processor is endowed with a configuration register, which may store a plurality of values configuring the operation of branch and inter-branch instruction counters. Some sections/fields of the configuration register may indicate to the processor whether to switch branch monitoring on or off in response to the occurrence of certain processor events, and/or in response to a change of context. In some embodiments, the configuration register may be writable by software, such as the operating system and/or a hypervisor, allowing for a software-controlled customization of branch monitoring. Such customization may allow some embodiments of the present invention to be used for a variety of problems, including malware detection, code debugging, code optimization, etc.

In some embodiments, code reuse analysis is further facilitated by saving an indicator of a memory location (e.g., a value of an instruction pointer such as the RIP) of each counted branch and/or inter-branch instruction to a processor register or to a reserved section or memory. Anti-malware software may then swiftly retrieve such addresses when needed, without further computation.

In some embodiments, the type of branch instruction counted by the processor is customizable. Typical monitored branch instructions include indirect jump and call instructions (e.g., JMP, CALL on x86 platforms). By changing the type of instruction counted by the processor, some embodiments may be tailored to a variety of applications. In one such example, excluding conditional branch instructions (e.g., JNZ on x86 platforms) from monitoring may prevent counting instructions executed repeatedly as part of a loop.

Various functional aspects of the present invention may be implemented at various stages of the processor pipeline. For instance, a determination of whether an instruction should be counted as a branch or an inter-branch instruction may be done at the instruction decode stage. Virtual addresses of instructions may be determined and saved at the execution stage. Advantageously, trigger events may be injected at several stages. For instance, a division by zero exception may be generated at the execution stage, while a page fault may be generated at the memory access stage. Such flexibility may offer an artisan substantial freedom in implementing some features of the present invention.

It will be clear to a skilled artisan that the above embodiments may be altered in many ways without departing from the scope of the invention. Accordingly, the scope of the invention should be determined by the following claims and their legal equivalents.

What is claimed is:

1. A host system comprising a hardware processor, the hardware processor including:
    a branch counter register configured to store a count of branch instructions occurring within a sequence of instructions executed by the hardware processor;
    an inter-branch instruction counter register configured to store a count of instructions occurring between two consecutive branch instructions within the sequence of instructions; and
    a counter control unit connected to the branch counter register, to the inter-branch instruction counter register, and to an instruction decoder module of the hardware processor,
    wherein the counter control unit comprises hardware logic configured to:
        perform branch monitoring, and
        trigger a switch event within the hardware processor according to a value stored in the branch counter register and according to a value stored in the inter-branch instruction counter register, wherein the switch event causes the hardware processor to switch from executing the sequence of instructions to executing an event handler routine,
    wherein branch monitoring comprises:
        determining whether a selected instruction of the sequence of instructions is a branch instruction;
        in response to determining whether the selected instruction is a branch instruction, when the selected instruction is a branch instruction, incrementing the value stored in the branch counter register; and
        in response to determining whether the selected instruction is a branch instruction, when the selected instruction is not a branch instruction, incrementing the value stored in the inter-branch instruction counter register;
    and wherein the hardware processor is further configured, in response to the switch event, to:
        identify a target execution thread according to the sequence of instructions; and
        in response to identifying the target execution thread, determine whether the target execution thread is performing a code-reuse attack.

2. The host system of claim 1, wherein the counter control unit is further configured to:
    compare the value stored in the branch counter register to a predetermined threshold; and in response, determine whether to trigger the switch event according to a result of the comparison.

3. The host system of claim 1, wherein the counter control unit is further configured to:
compare the value stored in the inter-branch instruction counter register to a predetermined threshold; and
in response, when the value stored in the inter-branch instruction counter register exceeds a predetermined threshold, reset the value stored in the branch counter register to zero.

4. The host system of claim 1, wherein the switch event comprises an exception, and wherein the event handler routine comprises an exception handler registered in an interrupt descriptor table (IDT) of the processor.

5. The host system of claim 1, wherein the host system exposes a virtual machine, wherein the sequence of instructions consists of code executing within the virtual machine, and wherein the event handler routine executes outside the virtual machine.

6. The host system of claim 1, wherein branch instructions include at least one instruction selected from a group consisting of a jump instruction, a call instruction, and a return instruction.

7. The host system of claim 1, wherein the hardware logic of the counter control unit is further configured, when the selected instruction is a branch instruction, to reset the value stored in the inter-branch instruction counter register to zero.

8. The host system of claim 1, wherein the hardware processor further includes a register having a branch identifier field, and wherein the counter control unit is configured to determine whether the selected instruction is a branch instruction according to a value stored in a branch identifier field.

9. The host system of claim 1, wherein the hardware processor further includes a register including a branch monitoring flag, and wherein the counter control unit is further configured to determine whether to perform the branch monitoring according to a value stored in the branch monitoring flag.

10. The host system of claim 1, wherein the counter control unit is further configured to suspend the branch monitoring in response to a context switch, the context switch comprising the hardware processor switching from executing instructions of a first thread to executing instructions of a second thread.

11. The host system of claim 1, wherein the counter control unit is further configured to suspend the branch monitoring in response to a hardware interrupt.

12. A method comprising:
employing a branch counter register of a hardware processor of a host system to store a count of branch instructions occurring within a sequence of instructions executed by the hardware processor;
employing an inter-branch instruction counter register of the hardware processor to store a count of instructions occurring between two consecutive branch instructions within the sequence of instructions;
employing a counter control unit of the hardware processor to perform branch monitoring, wherein branch monitoring comprises:
determining whether a selected instruction of the sequence of instructions is a branch instruction;
in response to determining whether the selected instruction is a branch instruction, when the selected instruction is a branch instruction, incrementing the value stored in the branch counter register; and
in response to determining whether the selected instruction is a branch instruction, when the selected instruction is not a branch instruction, incrementing the value stored in the inter-branch instruction counter register;
employing the counter control unit to trigger a switch event within the hardware processor according to a value stored in the branch counter register and according to a value stored in the inter-branch instruction counter register, wherein the switch event causes the hardware processor to switch from executing the sequence of instructions to executing an event handler routine;
in response to the switch event, employing the hardware processor to identify a target execution thread according to the sequence of instructions; and
in response to identifying the target execution thread, employing the hardware processor to determine whether the target execution thread is performing a code-reuse attack.

13. The method of claim 12, further comprising:
employing the counter control unit to compare the value stored in the branch counter register to a predetermined threshold; and
in response, employing the counter control unit to determine whether to trigger the switch event according to a result of the comparison.

14. The method of claim 12, further comprising:
employing the counter control unit to compare the value stored in the inter-branch instruction counter register to a predetermined threshold; and
in response, when the value stored in the inter-branch instruction counter register exceeds a predetermined threshold, resetting the value stored in the branch counter register to zero.

15. The method of claim 12, wherein the switch event comprises an exception, and wherein the event handler routine comprises an exception handler registered in an interrupt descriptor table (IDT) of the processor.

16. The method of claim 12, wherein the host system exposes a virtual machine, wherein the sequence of instructions consists of code executing within the virtual machine, and wherein the event handler routine executes outside the virtual machine.

17. The method of claim 12, wherein branch instructions include at least one instruction selected from a group consisting of a jump instruction, a call instruction, and a return instruction.

18. The method of claim 12, wherein the branch monitoring further comprises, when the selected instruction is a branch instruction, resetting the value stored in the inter-branch instruction counter register to zero.

19. The method of claim 12, wherein the hardware processor further includes a register having a branch identifier field, and wherein the counter control unit is configured to determine whether the selected instruction is a branch instruction according to a value stored in the branch identifier field.

20. The method of claim 12, wherein the hardware processor further includes a register including a branch monitoring flag, and wherein the counter control unit is further configured to determine whether to perform the branch monitoring according to a value stored in the branch monitoring flag.

21. The method of claim 12, further comprising suspending the branch monitoring in response to a context switch, the context switch comprising the hardware processor switching from executing a first thread to executing a second thread.

22. The method of claim 12, further comprising suspending the branch monitoring in response to a hardware interrupt.

23. A non-transitory computer-readable medium storing instructions which, when executed by a hardware processor of a host system, cause the host system to:
- detect a switch event generated within the hardware processor while the hardware processor is executing an instruction sequence, the switch event causing the hardware processor to switch from executing the instruction sequence to executing an event handler routine;
- in response to detecting the switch event, identify a target execution thread according to the instruction sequence; and
- in response, determine whether the target execution thread is performing a code-reuse attack, wherein the hardware processor comprises:
- a branch counter register configured to store a count of branch instructions occurring within the instruction sequence;
- an inter-branch instruction counter register configured to store a count of instructions occurring between two consecutive branch instructions within the instruction sequence; and
- a counter control unit connected to the branch counter register, to the inter-branch instruction counter register, and to an instruction decoder module of the processor, the counter control unit comprising hardware logic configured to:
- perform branch monitoring, and
- trigger the switch event according to a value stored in the branch counter register and according to a value stored in the inter-branch instruction counter register, wherein branch monitoring comprises:
- determining whether a selected instruction of the sequence of instructions is a branch instruction;
- in response to determining whether the selected instruction is a branch instruction, when the selected instruction is a branch instruction, incrementing the value stored in the branch counter register; and
- in response to determining whether the selected instruction is a branch instruction, when the selected instruction is not a branch instruction, incrementing the value stored in the inter-branch instruction counter register.

* * * * *